(12) United States Patent
Yuki et al.

(10) Patent No.: US 11,673,373 B2
(45) Date of Patent: Jun. 13, 2023

(54) MULTI-LAYERED GLASS

(71) Applicant: NAKAJIMA GLASS CO., INC., Ibara (JP)

(72) Inventors: Takeshi Yuki, Ibara (JP); Norihito Yuki, Ibara (JP); Masamitsu Funao, Ibara (JP)

(73) Assignee: NAKAJIMA GLASS CO., INC., Ibara (JP)

( * ) Notice: Subject to any disclaimer, the term of this patent is extended or adjusted under 35 U.S.C. 154(b) by 387 days.

(21) Appl. No.: 17/257,103

(22) PCT Filed: Jul. 5, 2018

(86) PCT No.: PCT/JP2018/025606
§ 371 (c)(1),
(2) Date: Dec. 30, 2020

(87) PCT Pub. No.: WO2020/008612
PCT Pub. Date: Jan. 9, 2020

(65) Prior Publication Data
US 2021/0129499 A1  May 6, 2021

(51) Int. Cl.
| | | |
|---|---|---|
| *B32B 17/10* | (2006.01) | |
| *B32B 27/08* | (2006.01) | |
| *B32B 27/28* | (2006.01) | |
| *B32B 27/40* | (2006.01) | |

(52) U.S. Cl.
CPC .. *B32B 17/10366* (2013.01); *B32B 17/10055* (2013.01); *B32B 17/1077* (2013.01);
(Continued)

(58) Field of Classification Search
CPC ........ B32B 17/10366; B32B 17/10055; B32B 17/10302; B32B 17/10678;
(Continued)

(56) References Cited

U.S. PATENT DOCUMENTS 4,658,553 A * 4/1987 Shinagawa ......... E06B 3/66319
52/204.593
4,994,309 A   2/1991 Reichert et al.
(Continued)

FOREIGN PATENT DOCUMENTS

JP   H08151865 A    6/1996
JP   2011241114 A  12/2011
(Continued)

OTHER PUBLICATIONS

Extended European Search Report dated Feb. 25, 2022, by the European Patent Office in corresponding European Patent Application No. 18925217.4. (7 pages).
(Continued)

*Primary Examiner* — Betelhem Shewareged
(74) *Attorney, Agent, or Firm* — Buchanan, Ingersoll & Rooney PC

(57) ABSTRACT

There is provided a multi-layered glass in which two glass plates are placed such that they form a space via a spacer placed in a peripheral part of glass plates, wherein at least one low-emissivity film, which includes a plastic film and a Fabry-Perot interference filter formed on one side or both sides of the plastic film, is placed in the space, whereby space is divided; each of gaps between the glass plates and the spacer, and between the low-emissivity film and the spacer is sealed with a primary sealing material; a gap between the glass plates outside of the primary sealing material and the spacer is sealed with a secondary sealing material; and a reinforcement material is placed inside of the secondary sealing material. The multi-layered glass has a good appearance and excellent heat-insulating properties.

12 Claims, 3 Drawing Sheets

(52) U.S. Cl.
CPC .. *B32B 17/10302* (2013.01); *B32B 17/10678* (2013.01); *B32B 17/10798* (2013.01); *B32B 27/08* (2013.01); *B32B 27/283* (2013.01); *B32B 27/40* (2013.01); *B32B 2307/30* (2013.01); *B32B 2307/40* (2013.01); *B32B 2315/08* (2013.01); *B32B 2375/00* (2013.01); *B32B 2383/00* (2013.01)

(58) Field of Classification Search
CPC .......... B32B 17/1077; B32B 17/10798; B32B 27/08; B32B 27/283; B32B 27/40; B32B 2307/30; B32B 2307/40; B32B 2315/08; B32B 2375/00; B32B 2383/00
USPC ........................................................ 428/192
See application file for complete search history.

(56) References Cited

U.S. PATENT DOCUMENTS

2002/0189743 A1* 12/2002 Hornung ................... E06B 3/56
156/292
2014/0247475 A1* 9/2014 Parker ................. E06B 3/66328
359/275
2016/0120336 A1 5/2016 Schneider et al.
2021/0129499 A1* 5/2021 Yuki ................. B32B 17/10055

FOREIGN PATENT DOCUMENTS

| | | |
|---|---|---|
| JP | 2011242094 A | 12/2011 |
| JP | 2016531063 A | 10/2016 |
| JP | 2018123540 A | 8/2018 |
| WO | 2014/193642 A1 | 12/2014 |

OTHER PUBLICATIONS

International Search Report (PCT/ISA/210) dated Oct. 9, 2018, by the Japanese Patent Office as the International Searching Authority for International Application No. PCT/JP2018/025606, and an English translation of the International Search Report.

Written Opinion (PCT/ISA/237) dated Oct. 9, 2018, by the Japanese Patent Office as the International Searching Authority for International Application No. PCT/JP2018/025606.

* cited by examiner

PRIOR ART

MULTI-LAYERED GLASS

TECHNICAL FIELD

The present invention relates to a multi-layered glass having excellent heat-insulating properties.

BACKGROUND ART

A multi-layered glass has been extensively used as glazing for buildings, due to its excellent heat-insulating properties. However, lately, it has been required to reduce energy consumption in residential houses, building, or the like, and thus glazing with further improved insulating properties is in demand.

A known method for improving the heat-insulating properties of a multi-layered glass involves placing a plastic film in a space between glass plates to divide the space. However, shrinkage of the plastic film placed between the glass plates causes wrinkle formation, leading to poor appearance.

Patent Document No. 1 describes a multi-layered glass as shown in FIG. 6, in which spacer members 4' and 4" are fixed to the peripheral parts of the two glass plates 1 and 1', and film 3 is placed between the spacer members 4' and 4" creating an intermediate layer 2 divided by film 3 between the glass plates 1 and 1', with the outer peripheral side of the spacer members 4',4" sealed with a sealing material 8. The end portion of film 3 protruding from the spacer members 4',4" to the outer peripheral sides is enclosed in the sealing material 8, and the moisture-proof layer 9 adhered to the two glass plates 1, 1' is formed on the outer peripheral side of the sealing material 8. Patent Document 1 describes that film 3 is heated to prevent wrinkle formation. It describes that since film 3 must be firmly fixed during heating, the sealing material 8 for fixing film 3 is made of a material that hardly melts such as a polyurethane. It further describes that the infiltration of moisture from outside air into the intermediate layer 2 can be prevented by forming a moisture-proof layer 9 in the outer to peripheral side of sealing material 8. There is, however, a problem that when multiple films 3 are placed or when film 3 is large, the film(s) 3 may shrink to cause wrinkle formation, leading to poor appearance.

PRIOR ART DOCUMENT

Patent Document

Patent Document No. 1: JP 8-151865 A

SUMMARY OF THE INVENTION

Problems to be Solved by the Invention

To solve the above problem, an objective of the present invention is to provide a multi-layered glass having a good appearance and excellent heat-insulating properties.

Means for Solving the Problems

The problem can be solved by providing a multi-layered glass in which glass plates are placed such that they form a space via a spacer placed in a peripheral part of the glass plates, wherein at least one low-emissivity film, which comprises a plastic film and a Fabry-Perot interference filter formed on one side or both sides of the plastic film, is placed in the space, whereby the space is divided; each gap between the glass plates and the spacer, and between the low-emissivity film and the spacer is sealed with a primary sealing material; a gap between the glass plates outside of the primary sealing material and the spacer is sealed with a secondary sealing material; and a reinforcement material is placed inside of the secondary sealing material.

It is suitable that the reinforcement material has a substantially rectangular plate shape, and is placed such that the inner side of the reinforcement material and the outer side of the spacer face each other. It is also suitable that a width of the reinforcement material in a thickness direction of the multi-layered glass is smaller by 0.2 mm or more than a distance between the glass plates. It is also preferable that a width of the secondary sealing material in a depth direction of the multi-layered glass is n×1 mm to n×20 mm, where n is the number of the low-emissivity film, and a distance between the reinforcement material and the spacer is 0.5 mm or more.

It is preferable that the spacer comprises a joint part formed by joining multiple members, and the reinforcement material placed facing the joint part. It is further preferable that the spacer comprises a substantially L-shaped member inserted into the multiple members to join the members, and an angle of the substantially L-shaped member is 60 to 120°.

It is also preferable that the spacer comprises a bent part, and the bent part is placed in a corner section of the multi-layered glass.

It is preferable that the spacer comprises a joint part consisting of mutually joined members whose edges are cut at an angle of θ/2, and the joint part is placed in a corner section of the multi-layered glass, where θ denotes an angle of the corner section and is 60 to 120°. It is also preferable that the outer surface of the spacer in the corner section of the multi-layered glass is covered by a reinforcement tape.

It is also preferable that the glass plate is made of a tempered glass. It is also preferable that the space is filled with at least one gas selected from the group consisting of air, argon, krypton, and xenon. It is also preferable that the secondary sealing material comprises an inner layer made of a polyurethane and an outer layer made of silicone, and the reinforcement material is placed between the inner layer and the outer layer.

Effects of the Invention

A multi-layered glass of the present invention has excellent heat-insulating properties because a space between glass plates is divided with a low-emissivity film. Furthermore, according to the present invention, wrinkle formation in the low-emissivity film is inhibited, and thus, the multi-layered glass has a good appearance.

MODES FOR CARRYING OUT THE INVENTION

A multi-layered glass of the present invention is a multi-layered glass in which glass plates are placed such that they form a space via a spacer placed in a peripheral part of the glass plates, wherein at least one low-emissivity film, which comprises a plastic film and a Fabry-Perot interference filter formed on one side or both sides of the plastic film, is placed in the space, whereby the space is divided; each gap between the glass plates and the spacer, and between the low-emissivity film and the spacer is sealed with a primary sealing material; a gap between the glass plates outside of the primary sealing material and the spacer is sealed with a secondary sealing material, and a reinforcement material is placed inside of the secondary sealing material.

Figure 1:
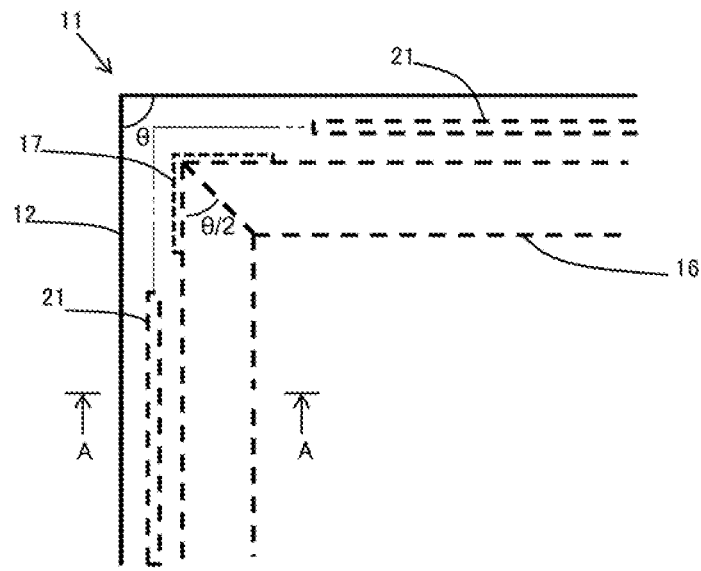
FIG. 1 is a schematic front view of an example of a multi-layered glass of the present invention.
Figure 2:
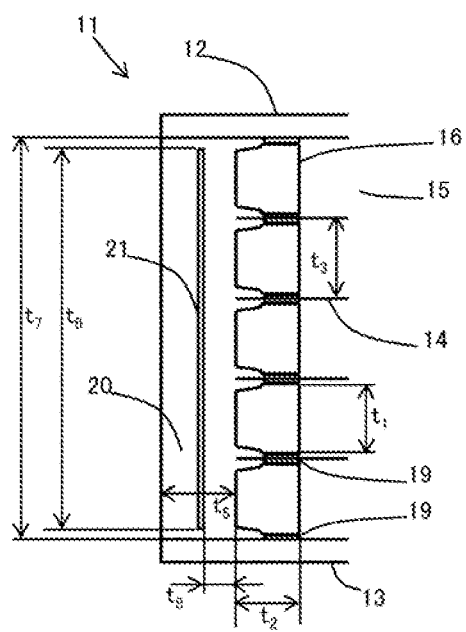
FIG. 2 is a cross-sectional view taken on line A-A in FIG. 1.

Hereinafter, the present invention will be described in more detail in with reference to the drawings. FIG. 1 is a schematic front view of an example of a multi-layered glass 11 of the present invention, and FIG. 2 is a cross-sectional view taken on line A-A in FIG. 1. The multi-layered glass 11 shown in FIGS. 1 and 2 is an example in which four low-emissivity films 14 are placed between glass plates 12 and 13.

In multi-layered glass 11 of the present invention, at least one low-emissivity film 14, which comprises a plastic film and a Fabry-Perot interference filter formed on one side or both sides of the plastic film, is placed in the space 15 between glass plates 12 and 13, whereby space 15 is divided. Here, glass plate 12, the low-emissivity film 14, and glass plate 13 are placed in parallel with each other. Such a configuration allows for reducing heat transmission coefficient so that multi-layered glass 11 with excellent heat-insulating performance can be obtained.

As shown in FIG. 2, space 15 between glass plates 12 and 13 is formed via spacers 16 placed in the peripheral part of glass plates 12 and 13. Two or more spacers 16 are placed between glass plates 12 and 13, and the low-emissivity film 14 is placed between the spacers 16.

Examples of a material for the spacer 16 include metal, plastic, and ceramic. Spacer 16 is set up for forming the space 15 between glass plates 12 and 13 and holding the low-emissivity film 14 which divides the space 15. Therefore, it is preferably made of a material with higher strength. In this light, the spacer 16 is preferably made of metal or plastic, more preferably metal. The metal is preferably a stainless-steel, an aluminum-alloy, or the like, more preferably a stainless-steel in particular. As for plastic, an FRP (fiber reinforced plastic) such as a GFRP (glass-fiber reinforced plastic) and a CFRP (carbon-fiber-reinforced plastic) is preferable.

A shape of the spacer 16 is preferably, but not limited to, tubular such as an almost angular tube, almost cylindrical, and the like. When it is tubular, a desiccant can be inserted therein. Depending on width $t_1$ of the spacer 16 in a direction of thickness of the multi-layered glass 11, thickness $t_3$ of space 15 after division is determined. Width $t_2$ of the spacer 16 in a direction of depth of the multi-layered glass 11 is preferably 5 to 15 mm.

In the present invention, it is preferable that the spacer 16 has a joint part formed by joining multiple members, and the joint part is placed in a corner section of the multi-layered glass 11. Here, the joint part is more preferably formed by joining members whose edges are cut at an angle of θ/2, where θ denotes an angle of the corner section of the multi-layered glass 11 and is preferably 60 to 120°. The Joint part formed by joining edges of members cut at an edge angle θ/2 of 45° is placed in the corner section with an angle θ of 90° of the multi-layered glass 11 shown in FIG. 1. When the joint part of the spacer 16 is placed in the corner section with an angle of θ, edges cut at an angle of θ/2 can be joined, so that rigidity of the joint part of the spacer 16 is improved. Thus, wrinkle formation in the low-emissivity film 14 is inhibited, resulting in further improvement in the appearance of the multi-layered glass 11. From a similar point of view, it is also preferable that in the corner section of the multi-layered glass 11, the outer surface of the spacer 16 is covered by reinforcement tape 17. Examples of the reinforcement tape 17 include an aluminum foil tape, a copper foil tape, and a stainless-steel foil tape.

Figure 3:
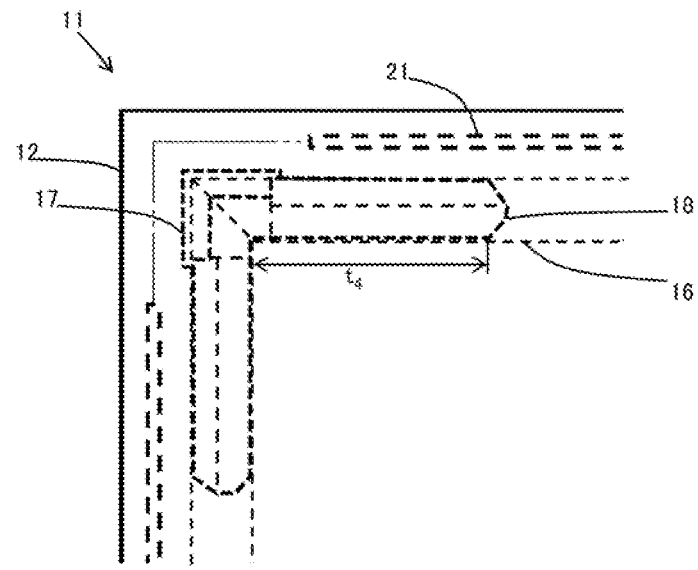
FIG. 3 is a schematic front view showing an example of a joint part formed by inserting a substantially L-shaped member into tubular members to join the members.

FIG. 3 is a schematic front view showing an example of a joint part formed by inserting a substantially L-shaped member 18 into tubular members to join the members. As shown in FIG. 3, it is preferable that the joint part of the spacer 16 is formed by joining multiple members by inserting a substantially L-shaped member 18 into the members. Joining the members using a substantially L-shaped member 18 allows for improving the rigidity of the joint part. Thus, wrinkle formation in the low-emissivity film 14 is inhibited, resulting in further improvement in the appearance of the multi-layered glass 11.

Figure 4:
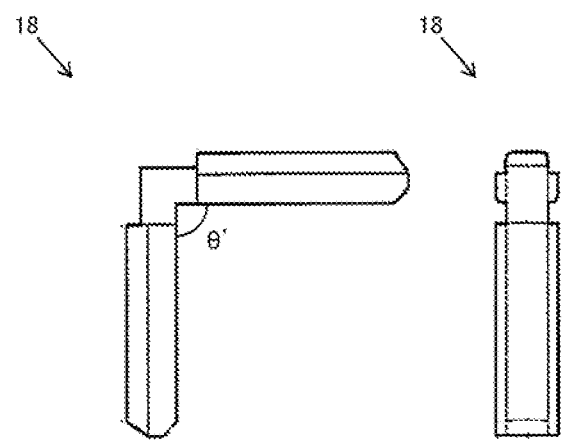
FIG. 4 is a front view and a side view of the substantially L-shaped member in the joint part shown in FIG. 3.

FIG. 4 is a front view and a side view of the substantially L-shaped member in the joint part shown in FIG. 3. There are no particular restrictions to a material for the substantially L-shaped member 18 as long as it does not impair the effects of the present invention; examples include metal, plastic, and ceramic. In the light of further improvement of the rigidity of the joint part, the substantially L-shaped member 18 is preferably made of a highly rigid material. In this light, a material for the substantially L-shaped member 18 is preferably metal or plastic, more preferably a metal. Examples of the metal include a zinc alloy such as ZDC1 and ZDC2; an iron alloy; an aluminum alloy; a copper alloy; and a magnesium alloy, preferably a zinc alloy in the light of excellent workability. The substantially L-shaped member 18 made of metal can be produced by, for example, a casting process. Preferable examples of plastic include an FRP (fiber reinforced plastic) such as a GFRP (glass-fiber reinforced plastic) and a CFRP (carbon-fiber-reinforced plastic).

An angle θ' of the substantially L-shaped member 18 is preferably 60 to 120°. In general, an angle θ' of the substantially L-shaped member 18 is the same as an angle θ of a corner section of the multi-layered glass 11. Furthermore, in the light of further improving the rigidity of the joint part, it is preferable that each of the inner (the side of the space 15) side and the outer (the peripheral side of the multi-layered glass 11) side of the substantially L-shaped member 18 is in face contact with the inner side of the spacer 16. Here, it is also preferable that each of length to of the contact face in the side of the space 15 in the substantially L-shaped member 18, in a plane direction of the multi-layered glass 11, is 32 mm or more.

When spacer 16 is made of metal, the joint part in the spacer 16 can be formed by welding members together.

It is also preferable that the spacer 16 has a bent part, and the bent part is placed in a corner section of the multi-layered glass. The bent part can be formed by bending one spacer.

In the present invention, a low-emissivity film 14, which comprises a plastic film and a Fabry-Perot interference filter formed on one side or both sides of the plastic film, is a film having a function to transmit visible ray and reflect far infrared rays, specifically a low-emissivity film formed by laminating multiple layers of metal or metal-oxide on one side or both sides of a plastic film. An example of such a low-emissivity film 14 is a low-emissivity film wherein multiple layers of metal such as Ag and of a metal oxide such as $SnO_2$, $ZnO_2$ and $TiO_2$ are alternately laminated on one side or both sides of a plastic film. In the light of keeping transparency and ensuring heat-insulating performance, the above low-emissivity film 14 is suitably a low-emissivity film 14 having a visible light transmittance of 50% or more and a corrected emissivity of 0.2 or less as determined in accordance with JIS R3107. Here, the corrected emissivity is more suitably 0.05 or less. There are no particular restrictions to a method for forming a Fabry-Perot interference filter, and it can be formed by sputtering or the like. As a specific example of the low-emissivity film 14, a low-emissivity film from Eastman Chemical Company, "Heat Mirror®" can be suitably used. Furthermore, a low-emissivity film 14 which comprises a plastic film and Fabry-Perot interference filters formed on both sides of the plastic film is suitably a low-emissivity film 14 having a visible light transmittance of 50% or more and a surface emissivity of 0.2 or less for both sides, from a similar perspective to the above low-emissivity film 14 in which a Fabry-Perot interference filter is formed on one side. As the low-emissivity film 14, for example, a low-emissivity film from Eastman Chemical Company "Heat Mirror®; TC: Twin Coat" can be used.

Herein, there are no particular restrictions to the number of the low-emissivity film 14 placed in the space 15 between glass plates 12 and 13 as long as it is one or more, and in the light of improving a heat transmission coefficient, it is preferably two or more. However, when multiple films are placed, visible light transmittance of a multi-layered glass 11 obtained may be reduced. Therefore, it is important to select the type and the number of the low-emissivity film 14, taking a balance between a heat transmission coefficient, a visible light transmittance, and heat shielding performance into account. In this light, the number of low-emissivity film 14 is preferably 4 or less. In case multiple films are placed, it is preferable that the sides of a Fabry-Perot interference filter face different spaces 15 when low-emission films 14 are placed in the space 15 between the glass plates 12 and 13 to divide the space. This is advantageous in that a heat transmission coefficient of the multi-layered glass 11 can be reduced, resulting in a further improved heat-shielding effect. From a similar perspective, when a low-emissivity film 14 which comprises a plastic film and Fabry-Perot interference filters formed on both sides of the plastic film is used, an embodiment where one film is placed is suitably employed.

As shown in FIG. 2, in the present invention, the thickness $t_3$ of the space 15 divided by the low emissivity film 14 is preferably 5 to 18 mm. When the thickness $t_3$ of the divided space 15 is within the above range, there is an advantage that the multi-layered glass 11 having an excellent heat-insulating effect can be obtained. The inventors have found that a heat transmission coefficient varies, depending on thickness $t_3$ of the divided space 15, and that an optimal thickness of the divided space 15 varies, depending on the type of gas enclosed in the space 15. When the thickness $t_3$ of the divided space 15 is less than 5 mm, the multi-layered glass 11 may expand and/or contract due to changes in temperature and atmospheric pressure, or an external force such as wind pressure is applied to the glass surface, so that the inner surface of the glass may come into contact with the film, leading to deterioration in the performance of the low-emissivity film 14. Thus, it is preferable that at least one of the thicknesses $t_3$ of the divided space 15 is 6 mm or more, more preferable 8 mm or more. Particularly preferably, all the divided space 15 have a thickness of 6 mm or more, most preferably 8 mm or more. On the other hand, if the thickness $t_3$ of the divided space 15 exceeds 18 mm, heat-insulating performance may deteriorate. Thus, more preferably, at least one thickness $t_3$ of the divided space 15 is 16 mm or less, and further preferably, all the divided space 15 have a thickness of 16 mm or less.

When space 15 is filled with argon gas, the thickness $t_3$ of the divided space 15 is preferably 5 to 18 mm, and more preferably at least one thickness is 12 to 18 mm, further preferably 16 mm. It is particularly preferable that not one but all of the divided space 15 have a thickness of 12 to 18 mm, most preferable 16 mm.

When space 15 is filled with krypton gas, preferably a thickness $t_3$ of the divided space 15 is 5 to 18 mm, and more preferably at least one thickness is 8 to 12 mm, further preferably 10 mm. It is particularly preferable that not one but all of the divided space 15 have a thickness of 8 to 12 mm, most preferable 10 mm.

When space 15 is filled with xenon gas, preferably a thickness $t_3$ of the divided spaces 15 is 5 to 10 mm, and more preferably at least one thickness is 5 to 8 mm, further preferably 6 mm. It is particularly preferable that not one but all of the divided space 15 have a thickness of 5 to 8 mm, most preferable 6 mm.

In the present invention, space 15 between glass plates 12 and 13 is filled with gas. Thus, a multi-layered glass 11 of the present invention with a higher heat-shielding effect can be obtained. The gas is preferably, but not limited to, at least one selected from the group consisting of air, argon, krypton, and xenon. The gas is preferably dry gas. In the light of further improving the heat-shielding effect, preferably space 15 is substantially filled with at least one gas selected from the group consisting of argon, krypton, and xenon, and among these, more preferably the space is substantially filled with a gas consisting of krypton or xenon alone. Here, the term "substantially" means that space 15 is filled with at least one selected from the group consisting of argon, krypton, and xenon, or gas consisting of krypton or xenon alone in a filling ratio of 90% or more.

There are no particular restrictions to the types of glass plates 12 and 13 in the outer sides used for the multi-layered glass 11 of the present invention; examples include, in addition to a soda-lime glass for construction, a borosilicate glass and an aluminosilicate glass. Since it has excellent strength and heat resistance and thus is suitably used as a window glass or the like, a soda-lime glass is preferable. From a similar perspective, it is also preferable that glass plates 12 and 13 are tempered glass plates. A plate thickness is appropriately selected depending on an application of the multi-layered glass 11, but for each glass plate, it is suitably 0.5 to 19 mm. Glass plates 12 and 13 used for the multi-layered glass 11 can be the same or different from each other. In the light of ensuring transparency, visible light transmittance of glass plates 12 and 13 is preferably 80% or more.

In the multi-layered glass 11 of the present invention, preferably a low-emissivity layer is formed on an inner surface of at least one of glass plates 12 and 13. Here, it is preferable that a low-emissivity film 14 facing the low-emissivity layer is a low-emissivity film 14 on one side of which a Fabry-Perot interference filter is formed, and the surface of the low-emissivity film 14 without a Fabry-Perot interference filter faces the low-emissivity layer. In other words, it is preferable that the surface of the glass plate with a low-emissivity layer and the Fabry-Perot interference filter surface of the low-emissivity film 14 face different spaces 15. Thus, a heat transmission coefficient of the multi-layered glass 11 of the present invention can be reduced, so that the heat-shielding effect is advantageously further improved. A suitable glass plate having a low-emissivity layer is, but not limited to, that having a visible light transmittance of 70% or more and a surface emissivity of 0.2 or less in the light of ensuring heat-insulating performance while keeping transparency. The low-emissivity layer can be, for example, a laminate of multiple layers made of metal such as Ag and metal-oxide such as $SnO_2$, $ZnO_2$, and $TiO_2$. The low-emissivity layer can be, for example, formed by, but not limited to, coating the surface of the glass plate with a low-emissivity layer by sputtering.

Each gap between the glass plate 12 and spacer 16, between the glass plate 13 and spacer 16, as well as between the low-emissivity film 14 and the spacer 16 is sealed with a primary sealing material 19. The primary sealing material 19 can be a non-solvent type of sealing material. Among these, butyl rubber is preferable in the light of particular higher gas barrier performance. Alternatively, a double-sided tape can be used as the primary sealing material 19.

A gap between glass plates 12 and 13 outside of the primary sealing material 19 and the spacers 16 is sealed with a secondary sealing material 20. Here, it is preferable that the low-emissivity film 14 protrudes outside of the primary sealing material 19, and an end of the low-emissivity film 14 is enclosed in the secondary sealing material 20. Thus, the low-emissivity film 14 is held by the secondary sealing material 20 whereby wrinkle formation is further inhibited, so that appearance of the multi-layered glass 11 obtained is further improved.

As shown in FIG. 2, it is preferable that width $t_5$ of the secondary sealing material 20 in a depth direction of the multi-layered glass 11 is n×1 mm to n×20 mm, where n is the number of the low-emissivity film 14. If the width $t_5$ is less than n×1 mm, gas barrier performance may be insufficient and a wrinkle may be easily formed in the low-emissivity film 14. The width $t_5$ is more preferably n×2 mm or more. If the width $t_5$ is more than n×20 mm, when the multi-layered glass 11 is used as window glass, the spacers 16 in the multi-layered glass 11 may not be inserted in a fitting part of a general-purpose sash, and thus the glass may not be used as general-purpose window glass.

Examples of the secondary sealing material 20 include a urethane resin, a silicone resin, and a sulfide resin. In particular, a urethane resin is preferable in light of its excellent adhesiveness to the low-emissivity film 14 and excellent gas barrier properties. In light of excellent durability, the silicone resin is preferable. The secondary sealing material 20 can be a single layer or a laminate of multiple resin layers. In the light of achieving compatibility between adhesiveness to the low-emissivity film 14 and gas barrier properties and durability, it is preferable that the secondary sealing material 20 has an inner layer made of a polyurethane and an outer layer made of silicone. Here, it is preferable that reinforcement material 21 is placed between the inner layer and the outer layer.

As described above, the primary sealing material 19 and the secondary sealing material 20 prevent external air from entering space 15 and fix the spacers 16 and the low-emissivity films 14 to glass plates 12 and 13.

In the present invention, a reinforcement material 21 must be placed inside the secondary sealing material 20. Thus, wrinkle formation in the low-emissivity film 14 is inhibited, so that appearance of a multi-layered glass 11 obtained is improved. Furthermore, the reinforcement material 21 placed in the inside of the secondary sealing material 20 reduces the amount of gas discharged through the secondary sealing material to outside, resulting in improvement in gas barrier properties. The present invention is particularly characterized in that the use of such reinforcement material 21 allows for high-level compatibility between gas barrier properties and durability, which is hard to achieve by the prior art. In the prior art, when a low-emissivity film is placed between glass plates, wrinkle is formed in the low-emissivity film, leading to poor appearance. In particular, when multiple low-emissivity films are placed or a large low-emissivity film is placed, appearance and gas barrier properties significantly deteriorate, and therefore, improvement has been required.

After an investigation to improve these points, the inventors have found the following. In producing a multi-layered glass comprising a low-emissivity film placed, generally, the low-emissivity film placed between glass plates is held by spacers, primary sealing material, and secondary sealing material. Next, the low-emissivity film is stretched while being heated in such a manner that any wrinkle is not formed, to divide the space between the glass plates. Here, if a shrinking force of the low-emissivity film is large, the spacers are deformed and the low-emissivity film shrinks, leading to wrinkle formation. To solve the problem, the inventors increased the width of the secondary sealing material in a depth direction of the multi-layered glass, which was effective for some improvement, but it was insufficient. In particular, when two or more low-emissivity films are placed, an inner spacer is more deformed than both outer spacers, leading to deterioration in appearance and gas barrier properties. The inventors have further continued investigation and have found that by placing a reinforcement material 21 in the inside of the secondary sealing material 20, wrinkle formation can be significantly inhibited, and thus the appearance of a multi-layered glass 11 obtained as well as gas barrier properties are improved. It can be considered that by placing the reinforcement material 21, deformation of the spacers 16 is inhibited, and even when a large shrinking force generates by placing multiple low-emissivity films 14, the applied force is dispersed to all spacers 16, so that only a particular spacer 16 is not extremely deformed. Resultantly, wrinkle formation would be inhibited. It is also considered that by placing the reinforcement material 21 in the inside of the secondary sealing material 20, gas permeation and spacer deformation are inhibited, resulting in improvement in gas barrier properties.

There are no particular restrictions to a material for the reinforcement material 21 as long as it does not impair the effects of the present invention; examples include metal, ceramic, and plastic. In the light of further inhibiting wrinkle formation in the low-emissivity film 14, the reinforcement material 21 is preferably highly strong and rigid. In this light, a material for the reinforcement material 21 is preferably metal or plastic, more preferably metal. The metal is preferably a steel such as a stainless-steel and a carbon-steel; an aluminum alloy; a copper alloy; or the likes, and in particular, more preferably a steel, further preferably a stainless-steel. The plastic is preferably a fiber-reinforced plastic such as a GFRP (glass-fiber reinforced plastic) and a CFRP (carbon-fiber-reinforced plastic) whose strength and rigidity are reinforced.

There are no particular restrictions to a shape of the reinforcement material 21 as long as it does not impair the effects of the present invention; for example, a substantially rectangular plate and a rod, and in the light of inhibition of deformation of the spacer 16 whereby wrinkle formation in the low-emissivity film 14 is further inhibited, the former is preferable. When the reinforcement material 21 is a substantially rectangular plate, its thickness is preferably 0.1 to 2 mm. The reinforcement material 21 can be placed in the inside of the secondary sealing material 20 placed in at least one side of the multi-layered glass 11. In the light of further inhibition of wrinkle formation in the low-emissivity film 14, it is preferably placed in the inside of the secondary sealing material 20 placed on all sides.

Figure 5:
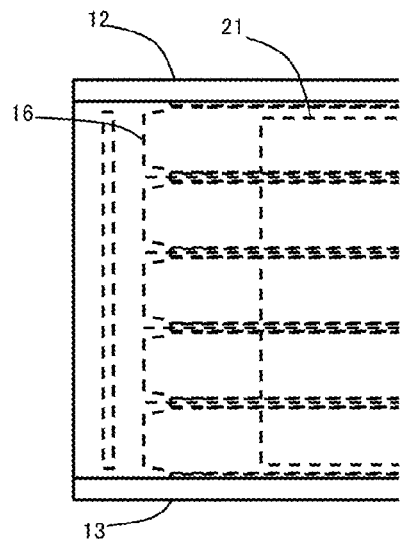
FIG. 5 is a side view of an example of a multi-layered glass of the present invention.
Figure 6:
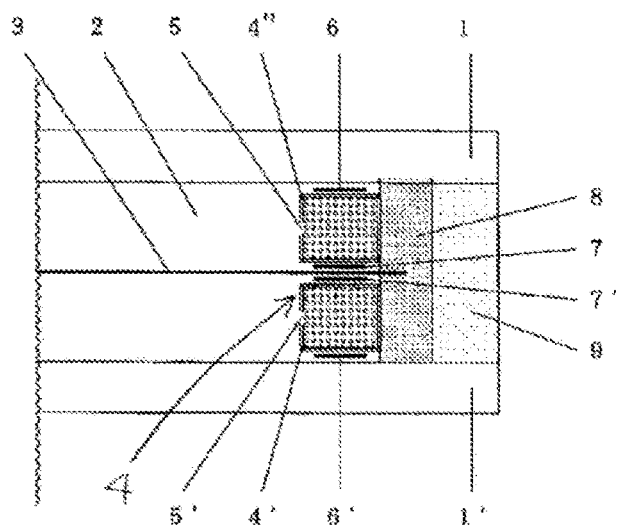
FIG. 6 is a schematic cross-sectional view of a multi-layered glass described in JP 8-151865 A.

In the light of inhibition of the deformation of the spacer 16 and further inhibition of wrinkle formation in the low-emissivity film 14, it is preferable that the inner side of the reinforcement material 21 and the outer side of the spacers 16 faces each other, as shown in FIG. 2. FIG. 5 is a side view of an example of a multi-layered glass 11 of the present invention. Specifically, the reinforcement material 21 is preferably placed such that it overlaps with the spacers 16 in side-view. Furthermore, as shown in FIG. 2, it is preferable that width $t_6$ of the reinforcement material 21 in a thickness direction of the multi-layered glass 11 is smaller by 0.2 mm or more than distance $t_7$ between the glass plates 12 and 13. If a difference $(t_7-t_6)$ between the distance $t_7$ between the glass plates 12 and 13 and the width $t_6$ of the reinforcement material is less than 0.2 mm, deformation of the multi-layered glass 11 may cause interference between the glass plate 12 or 13 and the reinforcement material 21, resulting in breakage of the multi-layered glass 11. Meanwhile, in the light of inhibition of deformation of the spacers 16 so as to further inhibit wrinkle formation in the low-emissivity film 14, a difference $(t_7-t_6)$ between the distance $t_7$ between the glass plates 12 and 13 and the width $t_6$ of the reinforcement material is preferably less than 10 mm.

As shown in FIG. 3, it is preferable that the spacer 16 comprises a joint part formed by joining multiple members, and the reinforcing material 21 is placed facing the joint part. Thus, the deformation of the spacer 16 is inhibited and wrinkle formation in the low-emissivity film 14 is further inhibited. When the joint part of the spacer 16 is formed using a substantially L-shaped member 18, the reinforcement material 21 and the substantially L-shaped member 18 can mutually face each other.

As shown in FIG. 2, a distance to between the reinforcement material 21 and the spacers 16 is preferably 0.5 mm or more. If the distance is less than 0.5 mm, the deformation of the multi-layered glass 11 may cause interference between the reinforcement material 21 and spacer 16.

A multi-layered glass 11 of the present invention preferably has a heat transmission coefficient of 1.0 W/m$^2$·K or less. Such a multi-layered glass 11 having a low heat transmission coefficient and excellent heat-insulating performance can be used as window glass for building to considerably reduce energy consumption. A heat transmission coefficient is more preferably 0.4 W/m$^2$·K or less. A heat transmission coefficient can be adjusted by the number of the low-emissivity film 14, the thickness of the divided space 15, type of filler gas, the presence or absence of a low-emissivity layer formed in the glass plate 12 or 13, and the like. In the multi-layered glass 11 of the present invention, even when the number of the low-emissivity film 14 is large, wrinkle formation in the low-emissivity film 14 is inhibited so that excellent appearance is maintained. Therefore, heat-insulating performance can be significantly improved by increasing the number of low-emissivity film 14.

There are no particular restrictions to the total thickness of the multi-layered glass 11 of the present invention, and it is preferably 80 mm or less. When the multi-layered glass 11 is used as a common window for buildings, the total thickness is more preferably 45 mm or less, further preferably 38 mm or less. In accordance with the present invention, the number of the low-emissivity film 14 can be increased while maintaining excellent appearance and gas barrier properties. As described above, heat-insulating performance can be improved by increasing the number of low-emissivity film 14 without increasing the total thickness.

There are no particular restrictions to a visible light transmittance of the multi-layered glass 11 of the present invention, which can be adjusted, depending on an application. In the light of daylighting when the multi-layered glass 11 is used as window glass for a building, it is preferably 50% or more.

Hereinafter, a method for producing multi-layered glass 11 of the present invention will be described with reference to FIGS. 1 and 2. Glass plates 12 and 13 are placed in parallel to the spacers 16, and at least one low-emissivity film 14, which comprises a plastic film and a Fabry-Perot interference filter formed on one side of the plastic film, is placed in space 15 between glass plates 12 and 13. Here, the low-emissivity film 14 is held by spacers 16, the primary sealing material 19, and secondary sealing material 20. Next, the low-emissivity film 14 is stretched to divide space 15. Here, in the light of inhibiting wrinkle formation in the low-emissivity film 14, the film is preferably stretched while being heated. Then, each divided space 15 is filled with gas, and space 15 is sealed by spacers 16, the primary sealing material 19, and secondary sealing material 20. For filling gas, holes are made in advance on spacer 16 and, as necessary, the reinforcement material 21 as a gas filling part, so that there are two holes for gas filling per one divided space 15 and from one hole, gas is charged. Then, the gas filling parts are screwed and the secondary sealing material 20 is applied over the screw for sealing. Thus, the multi-layered glass 11 can be obtained.

The multi-layered glass 11 of the present invention thus obtained has excellent heat-insulating properties because a space between the glass plates 12 and 13 is divided by the low-emissivity film 14. Furthermore, according to the present invention, wrinkle formation in the low-emissivity film 14 is inhibited, resulting in a good appearance of the multi-layered glass 11. Also, the multi-layered glass 11 has higher gas barrier properties. The multi-layered glass is, therefore, suitably used as window glass, a transparent wall material, or the like for construction such as buildings, houses, and the like.

EXAMPLES

Hereinafter, the present invention will be further specifically described with reference to Examples.

Example 1

As a glass plate 12, a tempered soda-lime glass in which a low-emissivity layer is formed on one side with a length of 1292 mm, a width of 935 mm, and a thickness of 3 mm was used. As a glass plate 13, a tempered soda-lime glass with a length of 1292 mm, a width of 935 mm, and a thickness of 3 mm was used. A low-emissivity film 14 was a low-emissivity film which comprises a plastic film and a Fabry-Perot interference filter formed on one side of the plastic film ["Heat Mirror®", from Eastman Chemical Company]. A primary sealing material 19 was a butyl rubber. A secondary sealing material 20 was a polyurethane resin. A reinforcement material 21 was a stainless-steel plate with a thickness of 0.5 mm, a width of 46.5 mm, and a length of 797 to 1260 mm.

A spacer 16 was produced as follows. A corner section of a substantially L-shaped member 18 made of a zinc alloy as shown in FIG. 4 was covered with a butyl rubber. It was inserted into tubular stainless-steel members whose edges are cut such that an angle θ/2 was 45°, and then the outer surface was covered with a reinforcing tape 17 (aluminum tape) to form a joint part (see FIG. 3). Thus, a substantially rectangular spacer 16 with a length of 1274 mm and a width of 916 mm, in which a joint part is formed in each corner, was obtained.

As shown in FIG. 2, four low-emissivity films 14 are placed between glass plates 12 and 13. Tubular spacers 16 with a width $t_1$ of 9.5 mm in a thickness direction and a width $t_2$ of 9.5 mm in a depth direction were placed between the glass plate 12 or 13 and the low-emissivity film 14 and between the low-emissivity films 14 such that thickness $t_3$ of each divided space 15 was 10 mm. Here, the glass plate 12 and the low-emissivity films 14 were placed such that both the low-emissivity layer in the glass plate 12 and the Fabry-Perot interference filter side of the low-emissivity film 14 faces downwards in FIG. 2. The gaps between the glass plate 12 and the spacer 16, between the glass plate 13 and the spacer 16, and between the low-emissivity film 14 and the spacer 16 were sealed with a primary sealing material 19, respectively. The outside of the primary sealing material 19 and the spacers 16 was filled with a polyurethane resin. Outside of the polyurethane resin, a reinforcement material 21 was placed. For a longer side, a material with a length of 1260 mm was used while for a shorter side, a material with a length of 885 mm or 797 mm was used. Here, the reinforcement material 21 was placed such that a distance between the glass plate 12 and the reinforcement material 21 and a distance between the glass plate 13 and the reinforcement material 21 were 2 mm, respectively and a distance between the reinforcement material 21 and the spacers 16 was 4 mm. Furthermore, as shown in FIG. 3, the reinforcement materials 21 were placed facing the substantially L-shaped members 18 in corner sections. However, in one shorter side, holes for gas filling were formed near a corner section as described later, and therefore, a reinforcement material 21 with a length of 797 mm was placed to avoid plugging of the holes. After the reinforcement material 21 was placed on each side as described above, an additional polyurethane resin was applied to form a secondary sealing material 20 with a width $t_5$ of 9 mm in a depth direction.

The low-emissivity films 14 are held by the spacers 16, the primary sealing materials 19, and the secondary sealing material 20. Here, in one shorter side of each spacer 16, two holes were made in advance as a gas filling part. Then, after the secondary sealing material 20 hardened, the low-emissivity film 14 was stretched under heating at 100° C. using a hot air convection furnace. Then, each space was filled with krypton gas from the gas filling part. Then, the gas filling parts were screwed and a polyurethane resin was applied over them for sealing. From the visual observation of the multi-layered glass 11 thus obtained, it was found that the low-emissivity films 14 had no wrinkles, having excellent appearance.

Comparative Example 1

A multi-layered glass 11 was produced as described in Example 1, except that a reinforcement material 21 was absent. From the visual observation of the multi-layered glass 11 obtained, it was found that in the corner sections of the low-emissivity films 14, wrinkles were formed, resulting in poor appearance. Particularly, in the inner low-emissivity films 14, a number of wrinkles were formed.

EXPLANATIONS OF SYMBOLS

11: Multi-layered glass
12, 13: Glass plate
14: Low-emissivity film
15: Space
16: Spacer
17: Reinforcement tape
18: Substantially L-shaped member
19: Primary sealing material
20: Secondary sealing material
21: Reinforcement material
$t_1$: Width of a spacer in a thickness direction of a multi-layered glass
$t_2$: Width of a spacer in a depth direction of a multi-layered glass
$t_3$: Thickness of a space after division
$t_4$: Length of the space-side contact surface of a substantially L-shaped member in the plane direction of a multi-layered glass
$t_5$: Width of a secondary sealing material in a depth direction of a multi-layered glass
$t_6$: Width of reinforcement material in a thickness direction of a multi-layered glass
$t_7$: Distance between glass plates
$t_8$: Distance between a reinforcement material and a spacer

The invention claimed is:

1. A multi-layered glass in which glass plates are placed such that they form a space via a spacer placed in a peripheral part of the glass plates, wherein
   at least one low-emissivity film, which comprises a plastic film and a Fabry-Perot interference filter formed on one side or both sides of the plastic film, is placed in the space, whereby the space is divided;
   each gap between the glass plates and the spacer, and between the low-emissivity film and the spacer is sealed with a primary sealing material;
   a gap between the glass plates outside of the primary sealing material and the spacer is sealed with a secondary sealing material; and
   a reinforcement material is placed inside of the secondary sealing material.

2. The multi-layered glass according to claim 1, wherein the reinforcement material has a substantially rectangular plate shape, and is placed such that the inner side of the reinforcement material and the outer side of the spacer face each other.

3. The multi-layered glass according to claim 1, wherein a width of the reinforcement material in a thickness direction of the multi-layered glass is smaller by 0.2 mm or more than a distance between the glass plates.

4. The multi-layered glass according to claim 1, wherein a width of the secondary sealing material in a depth direction of the multi-layered glass is n×1 mm to n×20 mm, where n is the number of the low-emissivity film, and a distance between the reinforcement material and the spacer is 0.5 mm or more.

5. The multi-layered glass according to claim 1, wherein the spacer comprises a joint part formed by joining multiple members, and the reinforcement material is placed facing the joint part.

6. The multi-layered glass according to claim 5, wherein the spacer comprises a substantially L-shaped member inserted into the multiple members to join the members, and an angle of the substantially L-shaped member is 60 to 120°.

7. The multi-layered glass according to claim 1, wherein the spacer comprises a joint part consisting of mutually joined members whose edges are cut at an angle of $\eta/2$, and the joint part is placed in a corner section of the multi-layered glass, where $\eta$ denotes an angle of the corner section and is 60 to 120°.

8. The multi-layered glass according to claim 1, wherein the spacer comprises a bent part, and the bent part is placed in a corner section of the multi-layered glass.

9. The multi-layered glass according to claim 1, wherein, the outer surface of the spacer in the corner section of the multi-layered glass is covered with a reinforcement tape.

10. The multi-layered glass according to claim 1, wherein the glass plate is made of a tempered glass.

11. The multi-layered glass according to claim 1, wherein the space is filled with at least one gas selected from the group consisting of air, argon, krypton, and xenon.

12. The multi-layered glass according to claim 1, wherein the secondary sealing material comprises an inner layer made of a polyurethane and an outer layer made of silicone, and the reinforcement material is placed between the inner layer and the outer layer.

\* \* \* \* \*